United States Patent [19]
Tomita et al.

[11] Patent Number: 4,710,541
[45] Date of Patent: Dec. 1, 1987

[54] PROCESS FOR MOLDING AND VULCANIZING RUBBER PRODUCTS

[75] Inventors: Seisuke Tomita, Tokorozawa; Takatsugu Hashimoto, Higashiyamato, both of Japan

[73] Assignee: Bridgestone Corporation, Tokyo, Japan

[21] Appl. No.: 790,228

[22] Filed: Oct. 22, 1985

[30] Foreign Application Priority Data

Oct. 22, 1984 [JP] Japan ................ 59-221805
Oct. 22, 1984 [JP] Japan ................ 59-221806

[51] Int. Cl.$^4$ .................. C08L 7/00; C08L 9/00; C08L 15/02; C08L 19/00
[52] U.S. Cl. ................ 525/104; 264/315; 428/447; 428/451; 525/105; 525/106; 525/476
[58] Field of Search ............ 525/104, 106, 105, 476, 525/404; 428/451, 447; 264/315

[56] References Cited

U.S. PATENT DOCUMENTS

| | | | |
|---|---|---|---|
| 3,031,423 | 4/1962 | Meier | 524/316 |
| 4,022,848 | 5/1977 | Lukich | 525/141 |
| 4,104,322 | 8/1978 | Snavely | 525/105 |
| 4,201,698 | 5/1980 | Itoh et al. | 525/106 |
| 4,265,801 | 5/1981 | Moody et al. | 525/105 |
| 4,341,675 | 7/1982 | Nakamura | 525/105 |
| 4,359,340 | 11/1982 | Comper et al. | 106/287.16 |
| 4,376,184 | 3/1983 | Itoh et al. | 525/105 |

Primary Examiner—Allan M. Lieberman
Attorney, Agent, or Firm—Birch, Stewart, Kolasch and Birch

[57] ABSTRACT

An improved process for molding and vulcanizing rubber products using a curing bladder, characterized in that the bladder is one which is made of a rubber compound containing (A) organic rubber and (B) polyorganosiloxane, the ratio of (A)/(B) being 95/5 to 5/95, or the bladder is one which is produced by surface treating (A) organic rubber with a silicone composition containing (A) organic rubber and (B) polyorganosiloxane, said polyorganosiloxane comprising at least two monovalent substituted or unsubstituted hydrocarbon groups having five or more carbon atoms and a C=C double bond connected to the silicon atom through at least one carbon atom, and having a degree of polymerization greater than 20.

13 Claims, No Drawings

PROCESS FOR MOLDING AND VULCANIZING RUBBER PRODUCTS

BACKGROUND OF THE INVENTION

1. Field of the Invention:

The present invention relates to a process for molding and vulcanizing rubber products. More particularly, it relates to a process for molding and vulcanizing rubber products by using an improved curing bladder. The process of this invention is particularly suitable for molding and vulcanizing tires.

2. Description of the Prior Art:

It has been a conventional practice for the production of pneumatic rubber tires for vehicles to mold and cure a green tire using a molding press. A green tire placed in a molding press is pressed against the mold surface by a bladder which is expanded by a fluid introduced therein. In this molding process, a green tire is molded and vulcanized in conformity with the mold surface that determines the tread pattern and the side wall structure.

The bladder used for molding and vulcanizing rubber products such as tires as mentioned above has been made of an organic rubber, particularly butyl rubber. A bladder of organic rubber has a disadvantage in that it is not readily released from the inside of a tire and it is bent when a tire is demolded. This causes defective molding of tires. In addition, the surface of a bladder of organic rubber becomes rough due to wear and this rough surface is easy to stick to the inside of a tire in the curing cycle and does not separate from the inside of a tire after curing when the bladder is shrunk. Moreover, the rough surface entraps air bubbles between the bladder and the inside of a tire being vulcanized, and the entrapped air bubbles prevent the smooth heat transfer and cause defective vulcanization.

For reasons mentioned above, the conventional curing bladder needs a release agent of silicone emulsion or the like that improves the lubricity between the bladder and the tire inside. The application of a release agent to the tire inside, however, is not desirable because it requires an additional production step and adversely affects the vulcanization step, resulting in defective products. In addition, the release agent adds to the items of inventory.

In order to eliminate the above-mentioned problems, there has been proposed a method for modifying the surface of the organic rubber bladder with silicone. The modification with methylhydrogensilane or dimethylhydrogensilane is disclosed in Japanese Patent Application Laid-open No. 111394/1982, and the modification with hydroxylsilane is disclosed in Japanese Patent Application Laid-open Nos. 111393/1982 and 119992/1982.

The conventional surface modification with silicone as mentioned above improves the releasability of the bladder surface from the tire inside, obviating the use of a release agent in the molding and vulcanization of tires. On the other hand, the surface modification impairs the durability of a bladder to such an extent that it is not practical. Under these conditions, there has been a strong demand for a practically useful curing bladder which has outstanding physical properties such as mechanical strength, heat resistance, and hot water resistance, as well as good releasability.

SUMMARY OF THE INVENTION

Accordingly, it is an object of the present invention to provide a process for molding and vulcanizing rubber products of good quality in an efficient manner with a durable bladder.

According to this invention, there is provided an improved process for molding and vulcanizing rubber products using a curing bladder, characterized in that the bladder is one which is made of a rubber compound containing (A) an organic rubber and (B) a polyorganosiloxane, the ratio of (A)/(B) being 95/5 to 5/95, or the bladder is one which is obtained by surface treating (A) an organic rubber with a silicone composition containing (B) a polyorganosiloxane, said polyorganosiloxane comprising at least two monovalent substituted or unsubstituted hydrocarbon groups having five or more carbon atoms and a C=C double bond connected to the silicon atom through at least one carbon atom, and having a degree of polymerization greater than 20.

According to a first preferred embodiment of this invention, the curing bladder used for molding and vulcanizing rubber products is one which is made of a rubber compound containing (A) an organic rubber and (B) 5 to 100% by weight of a first polyorganosiloxane and 95 to 0% by weight of a second polyorganosiloxane, the ratio of (A)/(B) being 95/5 to 5/95, said first polyorganosiloxane comprising at least two monovalent substituted or unsubstituted hydrocarbon groups having five or more carbon atoms and a C=C double bond connected to the silicon atom through at least one carbon atom, and having a degree of polymerization greater than 20, and said second polyorganosiloxane having substantially no monovalent substituted or unsubstituted hydrocarbon groups having five or more carbon atoms and a C=C double bond connected to the silicon atom through at least one carbon atom, but comprising other crosslinkable monovalent substituted or unsubstituted hydrocarbon groups, and having a degree of polymerization greater than 20.

The present inventors carried out a series of researches on the curing bladder made of a rubber compound of silicone rubber and organic rubber. As the result, it was found that it is possible to produce a curing bladder with outstanding releasability and durability from a covulcanized rubber compound of an organic rubber and a polyorganosiloxane comprising monovalent substituted or unsubstituted hydrocarbon groups having five or more carbon atoms and having a C=C double bond connected to the silicon atom through at least one carbon atom, and having a degree of polymerization greater than 20.

According to a second preferred embodiment of this invention, the curing bladder used for molding and vulcanizing rubber products is one which is obtained by surface treating an organic rubber with a silicone composition containing a polyorganosiloxane comprising at least two monovalent substituted or unsubstituted hydrocarbon groups having five or more carbon atoms and a C=C double bond connected to the silicon atom through at least one carbon atom, and having a degree of polymerization greater than 20. It was found that the curing bladder which is surface-treated with a silicone composition containing the above-specified polyorganosiloxane is outstanding in both releasability and durability.

The present invention was completed based on these findings.

The above and other objects, features and advantages of this invention will be more apparent from the following description.

DETAILED DESCRIPTION OF THE INVENTION

The curing bladder used in this invention is formed by using (A) an organic rubber and (B) a polyorganosiloxane.

Examples of the organic rubber include natural rubber, isoprene rubber, styrene-butadiene rubber, butadiene rubber, acrylonitrile-butadiene rubber, ethylene-α-olefin rubber, butyl rubber, halogenated butyl rubber, fluororubber, acrylic rubber, epichlorohydrin rubber, ethylene-vinyl acetate copolymer rubber, and ethylene-acrylate rubber.

Where the curing bladder is produced from a rubber compound of (A) an organic rubber and (B) a polyorganosiloxane, the preferred organic rubber includes ethylene-propylene rubber, ethylene-propylene-diene rubber, butyl rubber, halogenated butyl rubber, and acrylic rubber.

Where the curing bladder is produced by surface treating (A) an organic rubber with a silicone composition containing (B) a polyorganosiloxane, the preferred organic rubber includes cured butyl rubber and cured butyl type rubber. The bladder to be surface-treated with the silicone composition is a toroidal expandable bladder of cured butyl rubber or butyl type rubber which is used for the production of pneumatic or semi-pneumatic tires.

The polyorganosiloxane (B) is one which comprises at least two monovalent substituted or unsubstituted hydrocarbon groups having five or more carbon atoms and a C=C double bond connected to the silicon atom through at least one carbon atom, and has a degree of polymerization greater than 20. It is designated as "polyorganosiloxane (1)" hereinafter. More detailedly, the polyorganosiloxane (1) has a siloxane chain as a main chain. To the silicon atoms of the siloxane chain are connected organic groups selected from substituted and unsubstituted monovalent hydrocarbon groups. At least two organic groups in all the organic groups connected to the silicon atoms have five or more carbon atoms and a C=C double bond connected to the silicon atom through at least one carbon atom, respectively. The polyorganosiloxane has a degree of polymerization greater than 20.

The other organic groups connected to the silicon atom include, for example, alkyl groups such as methyl group, ethyl group, propyl group, butyl group, pentyl group, hexyl group, octyl group, and decyl group; aryl groups such as phenyl group; aralkyl groups such as β-phenylethyl group and β-phenylpropyl group; and halogenated hydrocarbon groups such as chloromethyl group, chlorophenyl group, 3,3,3-trifluoropropyl group, and aliphatic unsatulated groups such as vinyl group. It is desirable that more than 90 mol % of the organic groups should be methyl groups for ease of synthesis and good heat resistance and weatherability of polyorganosiloxane.

The bladder used in this invention contains, as mentioned above, polyorganosiloxane (1) which comprises as organic groups at least two monovalent hydrocarbon groups having five or more carbon atoms and a C=C double bond connected to the silicon atom through at least one carbon atom. This hydrocarbon group is referred to as "double-bond hydrocarbon group" hereinafter. The double-bond hydrocarbon group in the polyorganosiloxane molecule permits cocrosslinking between the organic rubber and the polyorganosiloxane. In the case where the organic rubber is surface-treated with a silicone composition containing the polyorganosiloxane (1), the double-bond hydrocarbon group permits the composition to be firmly bonded to the bladder of organic rubber, whereby a silicone surface film having good properties is formed.

If the number of the double-bond hydrocarbon groups in the molecule of polyorganosiloxane (1) is less than two, the rubber compound or coating film does not achieve good cocrosslinking through polyorganosiloxane. Therefore, such a rubber compound or coating film is poor in heat resistance.

The amount of the double-bond hydrocarbon groups should preferably be 0.05 to 20 mol %, particularly 0.05 to 10 mol % of the total organic groups. If it is less than 0.05 mol %, sufficient cocrosslinking may not be achieved. Moreover, the rubber compound may be poor in tear strength, or the bond strength between the silicone surface film and the bladder surface is low. The double-bond hydrocarbon groups in excess of 20 mol % also cause the same troubles as mentioned above.

Examples of the double-bond hydrocarbon groups in polyorganosiloxane (1) include alkyldenenorbornyl groups such as ethylidenenorbornyl group and methylenenorbornyl group; cyclopentenyl group, 4-pentenyl group, 4-hexenyl group, and cyclooctenyl group. Alkylidenenorbornyl groups are most suitable because they readily cocrosslink with the organic rubber.

If the amount of the double-bond hydrocarbon group is less than 20 mol % in the total organic groups, the polyorganosiloxane (1) may contain a small amount of vinyl groups and other aliphatic unsaturated groups.

The polyorganosiloxane (1) should have a degree of polymerization greater than 20, preferably greater than 1,000. If the degree of polymerization is lower than 20, the polyorganosiloxane (1) should contain a large amount of double-bond hydrocarbon groups to impart sufficient heat resistance. Such a polyorganosiloxane is not readily mixed with the organic rubber and the resulting cocrosslinked rubber is poor in physical properties.

The number of organic groups connected to each silicon atom in the polyorganosiloxane (1) should be 1.9 to 2.1, preferably 1.98 to 2.002. If this number is less than 1.9, polyorganosiloxane becomes resinous; and if it exceeds 2.1, a desired degree of polymerization is not obtained.

The above-mentioned double-bond hydrocarbon group, which is characteristic of this invention, can be readily introduced into the polyorganosiloxane by, for example, adding a nonconjugated diene such as 5-ethylidene-2-norbornene, 5-methylene-2-norbornene, dicyclopentadiene, 1,5-cyclooctadiene, 1,4-pentadiene, or 1,4-hexadiene to a polyorganosiloxane having hydrogen atoms connected to silicon atoms in the presence of a catalytic amount of platinum compound such as chloroplatinic acid. In the case of a compound having the norbornene ring, the double bond in the norbornene ring takes part in hydrosilylation; and in the case of 1,4-hexadiene, the terminal double bond takes part in hydrosilylation.

The polyorganosiloxane into which the double-bond hydrocarbon groups have been introduced as mentioned above is then readily polymerized in the usual way to make a polymer. The polymerization is accomplished by, for example, heating prescribed amounts of octamethylcyclotetrasiloxane, hexamethyldi(ethylidene-norbornyl) cyclotetrasiloxane, and decamethyltetrasiloxane in the presence of potassium hydroxide as a catalyst, followed by neutralization with phosphoric acid. In this way it is possible to obtain polyorganosiloxane containing ethylidenenorbornyl groups and having a degree of polymerization greater than 3,000.

The polyorganosiloxane as component (B) in this invention may contain, in addition to the polyorganosiloxane (1), a polyorganosiloxane having a degree of polymerization greater than 20 which does not substantially contain the double-bond hydrocarbon groups as specified above but contains other crosslinkable groups as the monovalent substituted or unsubstituted hydrocarbon groups connected to the silicon atoms. This polyorganosiloxane is referred to as "polyorganosiloxane (2)" hereinafter. Examples of polyorganosiloxane (2) include vinyl group-containing polyorganosiloxane, mercapto group-containing polyorganosiloxane, and (meth)acryloyl group-containing polyorganosiloxane. Preferably, the polyorganosiloxane (2) comprises polydimethylsiloxane as a main construction.

Where the bladder is produced from a compound of (A) organic rubber and (B) polyorganosiloxane according to this invention, the content of polyorganosiloxane (1) in (B) polyorganosiloxane is 5 to 100% by weight, and the content of polyorganosiloxane (2) in (B) polyorganosiloxane is 95 to 0% by weight. If the content of polyorganosiloxane (1) is less than 5% by weight, sufficient cocrosslinking is not achieved and sufficient tensile strength is not obtained.

Where the surface treatment is carried out with a silicone composition containing (B) polyorganosiloxane, polyorganosiloxane (2) may be added in an amount of 30 parts by weight or less, preferably 10 parts by weight or less, to 100 parts by weight of polyorganosiloxane (1) having the above-mentioned double-bond hydrocarbon groups, in order to improve releasability and heat resistance.

Incidentally, (B) polyorganosiloxane should preferably be a substantially linear polyorganosiloxane; but it may have branches and network structure in some parts of the molecule.

Where the curing bladder is produced from the rubber compound of (A) organic rubber and (B) polyorganosiloxane according to this invention, the ratio of (A)/(B) should be 95/5 to 5/95, preferably 90/10 to 10/90, more preferably 80/20 to 30/70. If the amount of (B) polyorganosiloxane in the rubber compound is less than 5% by weight, the resulting bladder does not have good heat resistance and sufficient releasability that permits the vulcanization of tires without a release agent. If it exceeds 95% by weight, the resulting bladder does not have sufficient strength and hot-water resistance required for a curing bladder. In addition, the resulting bladder is poor in durability and has a very short life.

In the case where the silicone composition is used as a silicone surface film, organic rubber may be incorporated into the silicone composition in the ratio of the organic rubber to the polyorganosiloxane of 95/5 to 0/100, preferably 80/20 to 0/100, so that the film has a sufficient strength. If the amount of organic rubber exceeds 95% by weight, the resulting silicone composition does not provide a silicone surface film having sufficient releasability.

The rubber compound or silicone composition of this invention may be incorporated with a reinforcing filler or non-reinforcing filler, if necessary. Examples of such fillers include fumed silica, precipitated silica, silica aerogel, crushed quartz, diatomaceous earth, titanium oxide, zinc oxide, magnesium carbonate, aluminum sulfate, calcium sulfate, barium sulfate, mica, asbestos, glass powder, and carbon black. These fillers may be treated with an organosilicone compound or polydiorganosiloxane to make the surface hydrophobic. Moreover, the rubber compound and the silicone composition may be incorporated with any other known additives such as heat resistance improver, flame retardant, vulcanization accelerator, processing aid, and coloring matter.

The rubber compound used in this invention is readily cured by cocrosslinking (A) organic rubber and (B) polyorganosiloxane with a vulcanizing agent such as organic peroxide, sulfur, sulfur donor, alkylphenol-formaldehyde resin, and quinoid.

The rubber compound of this invention which is composed of (A) organic rubber and (B) polyorganosiloxane, and if desired additives is molded and cured to make a curing bladder. The bladder is mounted inside a molding machine. It heats a green tire, while pressing it against the mold surface, to effect vulcanization under the normally used conditions.

The curing bladder produced from the rubber compound containing (A) organic rubber and (B) polyorganosiloxane is outstanding in releasability and physical properties such as mechanical strength, heat resistance, hot-water resistance, and durability.

The silicone composition in this invention is readily cured with an organic peroxide, sulfur, sulfur donor, alkylphenol-formaldehyde resin, quinold, and other vulcanizing agent. Sulfur, sulfur donor, and alkylphenol-formaldehyde resin are preferable among them because of their ability to bond the silicone surface film to the surface of curing bladder.

The silicone composition in this invention is used for the surface treatment of a curing bladder composed of an organic rubber. The surface treatment is accomplished by applying the silicone composition as such to a bladder, or by applying the silicone composition in the form of solution in an organic solvent or in the form of aqueous emulsion to a bladder, followed by curing with heating. The latter method is preferable because of workability.

Where the silicone composition is used in the form of solution in an organic solvent, the concentration of the solution may be 2 to 50% by weight, preferably be 5 to 30% by weight. Solutions of less than 2% by weight require a long time to form the silicone coating and swell the bladder. Solutions of more than 50% by weight do not provide a uniform film.

The organic solvent is not specifically limited so long as it dissolves the polyorganosiloxane. It includes, for example, petroleum ether, benzine, mineral turpentine, gasoline, kerosene, naphtha, cyclohexane, benzene, toluene, xylene, methyl chloride, methylene chloride, chloroform, carbon tetrachloride, trichloroethylene, freon 12, perchloroethylene, 2-ethylhexanol, ethyl ether, methyl ethyl ketone and methyl isobutyl ketone.

Where the silicone composition is used in the form of aqueous emulsion, 100 parts of the silicone composition is dispersed in 200 to 1800 parts by weight of water, preferably 500 to 1500 parts by weight of water. Emulsions with less than 200 parts by weight of water are too viscous to give a uniform silicone film; and emulsions with more than 1800 parts by weight of water require a long time for film formation and do not provide uniform film due to "running".

The aqueous emulsion may be incorporated with a surfactant and emulsion stabilizer for the emulsification and stabilization of the emulsion. The amount of the surfactant is 2 to 30 parts by weight, preferably 5 to 25 parts by weight for 100 parts by weight of the silicone composition. The suitable surfactants are nonionic, cationic, and anionic surfactants, and silicone surfactants. The emulsion stabilizer is used in an amount of 2 to 15 parts by weight for 100 parts by weight of the silicone composition. The suitable emulsion stabilizer is one which is commonly used for silicone emulsions.

According to the process of this invention for vulcanizing rubber products, the curing bladder having a coating film thereon formed by the surface treatment with the silicone composition as mentioned above is mounted inside a mold, and it is heated and pressurized in the mold under the conditions which are normally employed.

The polyorganosiloxane containing double-bond hydrocarbon groups which is used in this invention is capable of cocrosslinking with the organic rubber. Where a curing bladder made of organic rubber is surface-treated with the silicone composition containing the polyorganosiloxane, it is firmly bonded through vulcanization to the surface of the curing bladder. Therefore, the silicone composition according to the invention forms a good silicone surface film which is superior in releasability, mechanical strength, heat resistance, hot water resistance, and durability.

The process of this invention which employs the above-mentioned bladder performs efficient vulcanization of rubber products with a minimum of defective molding.

The invention is now illustrated with the following examples and comparative examples, which should not be construed to restrict the scope of this invention.

EXAMPLE 1 AND COMPARATIVE EXAMPLES 1 AND 2

In each example, a curing bladder was prepared from a rubber compound having the formulation and physical properties as shown in Table 1. The performance of the bladder was evaluated by vulcanizing tires in the usual way.

The polyorganosiloxane used in each example was prepared according to the following process.

Preparation of polymethyl(ethylidenenorbornyl) siloxane:

In a flask equipped with a dropping funnel were placed 592 parts of octamethylcyclotetrasiloxane, 20.7 parts of hexamethyldiethylidenenorbonylcyclotetrasiloxane, and 0.38 parts of decamethyltetrasiloxane, and the reactants were heated to 150° C. After the addition of 0.01 parts of potassium hydroxide as a catalyst, the reactants were stirred at 150° C. for 15 hours to effect polymerization. The reaction product was neutralized with 0.006 parts of phosphoric acid and then distilled away. Thus there was obtained 560 parts of polyorganosiloxane represented by the following formula.

Relative viscosity: 1.9 (1% toluene solution)
Molecular weight: 530,000
Ethylidenenorbornyl groups in the total organic groups: 0.5 mol %

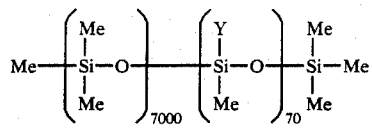

(where Me denotes a methyl group; and Y denotes a mixture of the following.)

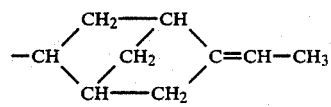

and

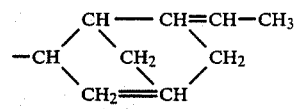

TABLE 1

|  | Example 1 | Comparative Example 1 | Comparative Example 2 |
| --- | --- | --- | --- |
| Formulation |  |  |  |
| Polymethyl(ethylidene-norbornyl)siloxane | 30 |  |  |
| Polymethylvinylsiloxane (vinyl groups: 0.5 mol %) |  | 30 |  |
| Butyl rubber *1 | 70 | 70 | 100 |
| Chloroprene rubber *2 | 5 | 5 | 5 |
| Silica *3 | 9 | 9 |  |
| Carbon black *4 | 28 | 28 | 40 |
| Zinc oxide | 3.5 | 3.5 | 5 |
| Stearic acid | 2.1 | 2.1 | 3 |
| Hexamethyldisilazane | 3 | 3 |  |
| Tackyrole 201 *5 | 5 | 5 | 5 |
| Aroma oil *6 |  |  | 5 |
| Physical properties (initial) |  |  |  |
| Tensile strength (Tb) | 120.8 | 87.5 | 138.2 |
| Elongation (Eb) | 760 | 560 | 800 |
| Hardness (Hd) | 53 | 49 | 52 |
| Hot water resistance (100° C.) |  |  |  |
| Change of Tb (%) | −5 | −40 | −2 |
| Change of Eb (%) | −15 | −25 | −10 |
| Change of Hd (%) | −8 | −8 | −6 |
| Performance |  |  |  |
| Releasability | good | good | poor |
| Durability | good | poor | good |

*1 Butyl 268 made by Japan Synthetic Rubber Co.
*2 Neoprene W made by Showa Neoprene Co.
*3 Aerosil 200 made by Nihon Aerosil Co.
*4 600A made by Tokai Carbon Co.
*5 Alkylphenol-formaldehyde resin made by Sumitomo Chemical Co.
*6 Aromax 100 made by Fuji Kosan Co.

It is noted from Table 1 that the process of this invention permits the efficient production of tires.

EXAMPLE 2

A silicone compound of the formulation as shown in Table 2 was dissolved in chloroform to make a 10 wt % solution. This solution was sprayed onto a curing bladder which is composed mainly of butyl rubber. After drying, the coating was vulcanized in an oven at 180° C. for 30 minutes.

TABLE 2

| (in parts by weight) | |
| --- | --- |
| Polyorganosiloxane* | 100 |

TABLE 2-continued

| (in parts by weight) | |
|---|---|
| Silica | 25 |
| Hexamethyldisilazane | 6 |
| Magnesia | 5 |
| Bengal red | 3 |
| Nocceler TRA | 5 |

*Polymethyl(ethylidenenorbornyl) siloxane, ethylidenenorbornyl groups: 0.5 mol %

Using this surface-treated bladder, green tires were molded and vulcanized repeatedly in the usual way without any release agent. Thirty to forty cycles were repeated very smoothly, during which it was not necessary to apply the silicone compound again to the Incidentally, the polyorganosiloxane used in this example was prepared in the same manner as in Example 1.

COMPARATIVE EXAMPLE 3

A bladder was surface-treated with a compound shown in Table 3 according to Example 1 in Japanese Patent Application Laid-open No. 111393/1982. Using this bladder, green tires were molded and vulcanized in the same manner as in Example 2. After eight to sixteen cycles, the bladder stuck to the inside of the tire and became unusable.

TABLE 3

| (in parts by weight) | |
|---|---|
| Bentonite clay | 31.2 |
| Water | 712.1 |
| Polydimethylsiloxane | 42.8 |
| Polydimethylsiloxane viscous fluid | 62.8 |
| Surface active agent | 6.25 |
| Rust inhibitor (sodium benzoate) | 5 |
| Defoamer | 0.33 |
| Stabilizer | 6.25 |

It is noted from Example 2 and Comparative Example 3 that the process of this invention permits very effective production of tires.

As mentioned in detail above, the process of this invention for molding and vulcanizing rubber products employs a curing bladder made of a rubber compound containing an organic rubber and a specific polyorganosiloxane, or a curing bladder which is surface-treated with a silicone compound containing a specific polyorganosiloxane. The curing bladder is superior in releasability, mechanical strength, heat resistance, hot water resistance, and durability.

Thus the process of this invention produces the effects of (1) molding and curing rubber products without release agent, (2) improving the yield with a minimum of defective products, (3) extending the life of the curing bladder, and (4) molding and curing rubber products efficiently at low cost.

What is claimed is:

1. A curing bladder, comprising:
a rubber compound containing (A) an organic rubber and (B) a polyorganosiloxane, the ratio of (A)/(B) being 95/5 to 5/95, said polyorganosiloxane (B) comprising at least two monovalent substituted or unsubstituted hydrocarbon groups having five or more carbon atoms and 0.05 to 20 mol % of a C=C double bond connected to the silicon atom through at least one carbon atom, and having a degree of polymerization greater than 20.

2. The curing bladder as claimed in claim 1, wherein the organic rubber is selected from the group consisting of natural rubber, isoprene rubber, styrene-butadiene rubber, butadiene rubber, acrylonitrile-butadiene rubber, ethylene-α-olefin rubber, butyl rubber, halogenated butyl rubber, fluororubber, acrylic rubber, epichlorohydrin rubber, ethylene-vinyl acetate copolymer rubber, ethylene-propylene rubber and ethylene-propylene-diene rubber.

3. The curing bladder as claimed in claim 1, wherein the polyorganosiloxane further comprises organic groups connected to the silicon atom and wherein the organic groups are selected from the group consisting of alkyl groups, aryl groups, aralkyl groups, halogenated hydrocarbon groups and aliphatic unsaturated groups.

4. The curing bladder as claimed in claim 3, wherein more than 90 mol % of the organic groups are methyl groups.

5. The curing bladder as claimed in claim 1, wherein the hydrocarbon groups in the polyorganosiloxane are selected from the group consisting of alkylidenenorbornyl groups, cyclopentenyl groups, 4-pentenyl groups, 4-hexenyl groups, and cyclooctenyl groups.

6. The curing bladder as claimed in claim 1, wherein the polyorganosiloxane further comprises vinyl groups or aliphatic unsaturated groups.

7. The curing bladder as claimed in claim 1, wherein the degree of polymerization is greater than 1,000.

8. The curing bladder as claimed in claim 1, wherein the monovalent hydrocarbon group having five or more carbon atoms and a C=C double bond connected to the silicon atom through at least one carbon atom is an alkylidenenorbornyl group.

9. The curing bladder as claimed in claim 1, wherein the polyorganosiloxane has 1.9 to 2.1 organic groups per silicon atom, with the monovalent hydrocarbon group having five or more carbon atoms and a C=C double bond connected to the silicon atom through at least one carbon atom accounting for 0.05 to 20 mol % in the total organic groups, and has a degree of polymerization greater than 1000.

10. The curing bladder as claimed in claim 9, wherein the polyorganosiloxane has 1.98 to 1,002 organic groups per silicon atom.

11. The curing bladder as claimed in claim 1, wherein the polyorganosiloxane is selected from the group consisting of vinyl group-containing polyorganosiloxane, mercapto group-containing polyorganosiloxane, (methyl acryloyl group-containing polyorganosiloxane and polydimethylsiloxane.

12. The curing bladder as claimed in claim 1, wherein the ratio of (A)/(B) is 80/20 to 30/70.

13. The curing bladder as claimed in claim 1, wherein the curing bladder is made of a rubber compound containing (A) an organic rubber and (B) a polyorganosiloxane composed of (1) 5 to 100% by weight of polyorganosiloxane comprising at least two monovalent substituted or unsubstituted hydrocarbon groups having five or more carbon atoms and a C=C double bond connected to the silicon atom through at least one carbon atom and having a degree of polymerization greater than 20, and (2) 95 to 0% by weight of polyorganosiloxane having substantially no monovalent substituted or unsubstituted hydrocarbon groups groups having five or more carbon atoms and a C=C double bond connected to the silicon atom through at least one carbon atom but comprising other crosslinkable monovalent substituted or unsubstituted hydrocarbon groups, and having a degree of polymerization greater than 20.

* * * * *